H. GREEN.
AIR BRAKE AND STARTER FOR AUTOMOBILES.
APPLICATION FILED OCT. 11, 1920.
1,399,860. Patented Dec. 13, 1921.
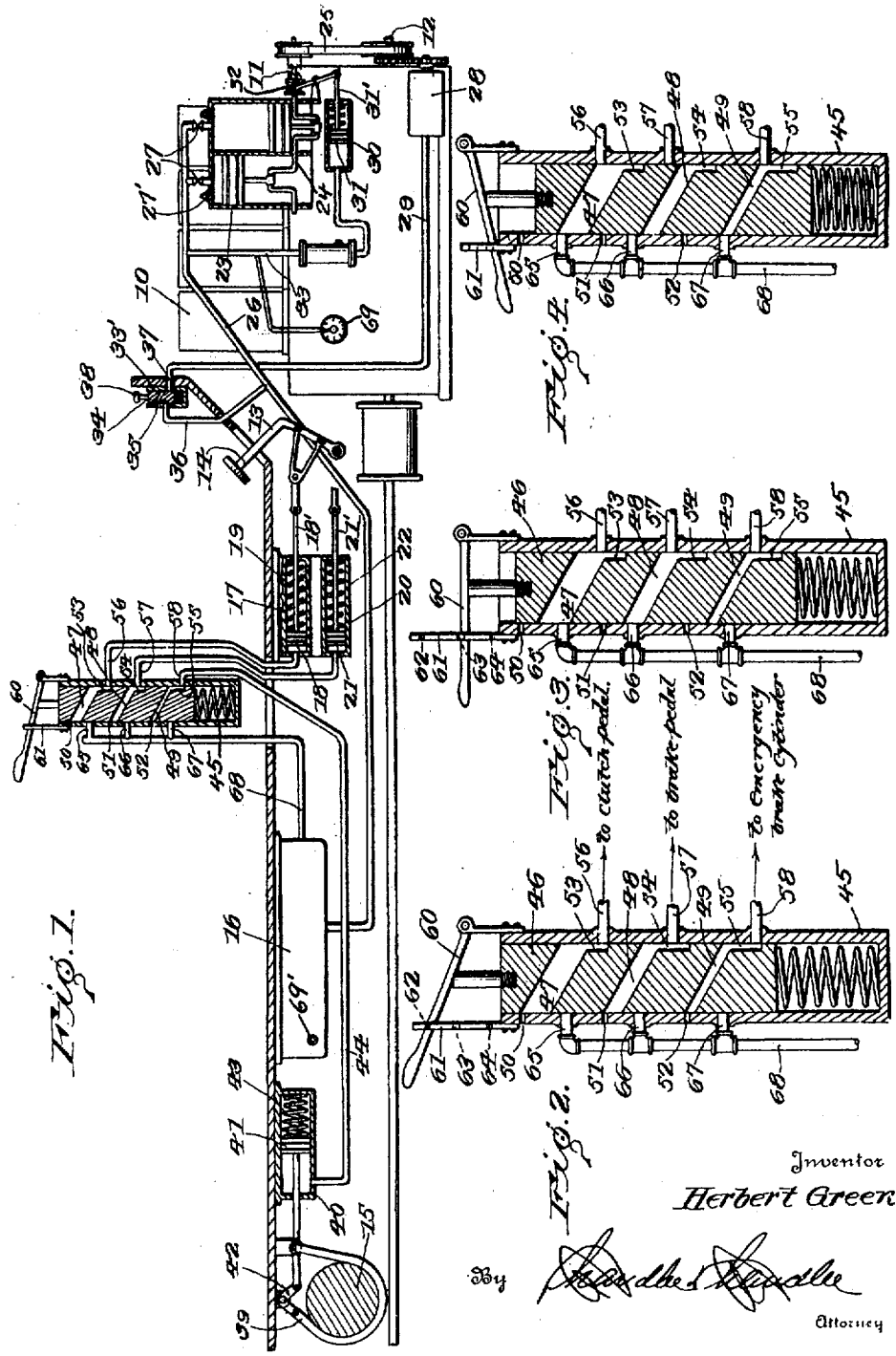

UNITED STATES PATENT OFFICE.

HERBERT GREEN, OF SAN ANTONIO, TEXAS.

AIR-BRAKE AND STARTER FOR AUTOMOBILES.

1,399,860.  Specification of Letters Patent.  Patented Dec. 13, 1921.

Application filed October 11, 1920. Serial No. 415,993.

*To all whom it may concern:*

Be it known that I, HERBERT GREEN, a citizen of the United States, residing at San Antonio, in the county of Bexar, State of Texas, have invented certain new and useful Improvements in Air-Brakes and Starters for Automobiles; and I do hereby declare the following to be a full, clear, and exact description of the invention, such as will enable others skilled in the art to which it appertains to make and use the same.

This invention relates to new and useful improvements in brakes and particularly to brakes for automobiles.

One object of the invention is to provide a system of elements, which are applicable to an automobile, whereby the operator can easily and quickly release the clutch, and apply the brakes, without the use of the feet.

Another object is to provide a mechanism of this character whereby the operator can release the clutch, apply the brake which is ordinarily applied by means of the foot pedal, and subsequently apply the emergency brake which is ordinarily applied by means of the hand lever, all of which is controlled by a valve operable by one hand of the operator.

Another object is to provide such a brake system that it can be readily applied to the braking system of the ordinary automobile without modifications thereof, and wherein the ordinary use of the foot and hand levers is not interfered with.

Other objects and advantages will be apparent from the following description when taken in connection with the accompanying drawings.

In the drawings:

Figure 1 is a diagrammatic view of the braking system applied to an automobile, the various cylinders being shown in sections.

Fig. 2 is an enlarged vertical longitudinal sectional view through the control valve, the same being in normal or inoperative position.

Fig. 3 is a similar sectional view showing the valve in position to release the clutch and apply the ordinary foot brake.

Fig. 4 is a similar sectional view of the valve showing the same in position for applying the emergency brake.

Referring particularly to the accompanying drawings, 10 represents the engine, 11 the fan shaft, 12, the crank shaft of the engine, 13 the link which connects with the brake pedal, 14 the clutch pedal, and 15 the band brake of the rear wheels of the automobile, in connection with which the invention is particularly adapted for use. The brake pedal is identical, in construction, to the clutch pedal, and is therefore not shown.

Mounted on the automobile, at a suitable point, is an air tank 16, in which is stored compressed air for use with the brake mechanism. Adjacent the pedal 13 is a cylinder 17, in which is disposed a piston 18 having its stem 18' pivotally connected to the brake pedal 13, a coil spring 19 being disposed in the cylinder and bearing against the piston and one end of the cylinder to yieldably hold the piston at one end of the cylinder. A similar cylinder 20, with a piston 21 and stem 21', are mounted adjacent the clutch pedal 14, said stem being pivotally connected to said pedal. In this cylinder 20 is a coil spring 22 which holds the piston at one end of the cylinder. On one side of the engine is mounted an air pump 23, having its crank shaft 24 to serve as the fan shaft 11 and connected thereto, a belt 25 being engaged with the crank shaft 12 and the fan shaft 11 to drive both the pump and fan. Connecting the cylinders of the pump with the air tank 16, is an air conduit 26, and in this conduit, adjacent the cylinders of the pump, are check valves 27, which operate automatically to prevent back pressure in the pump when the pressure in the tank 16 has reached its maximum. Geared to the crank shaft of the engine is an air starting motor 28, the same having an air pipe 29 leading therefrom and to a controlling valve which will be later described. Below the pump is a cylinder 30 in which is disposed a piston 31 and stem 31', the latter being connected to a clutch 32, of the crank shaft of the pump, an air pipe 33 connecting this cylinder with the air conduit 26. When the air pressure in the tank 16 reaches its maximum the air will pass into the cylinder 30, and drive the piston 31 forwardly with the result that the clutch 32 will be thrown out and the pump rendered inoperative. To operate the starting motor there is provided a valve casing 33' in which is disposed a sliding plug valve 34, said plug having an air passage 35 therethrough, one end being arranged to communicate with the pipe 29 and the other with a pipe 36 which leads from the valve casing to the pipe 26. This valve plug is normally held in elevation by the spring 37, so that its air passage 35 is out of register with the pipes 29 and 36, thus preventing air passing through the valve. A finger button 38 is carried by the upper end of the valve plug, the whole valve being located on the steering wheel of the automobile, or may be placed on the floor of the automobile, to be depressed by the foot of the operator.

Mounted adjacent the brake rod 39 is a brake cylinder 40 in which is disposed a piston 41 having its stem 41' connected to one arm of a bell crank lever 42, the other arm of the bell crank being connected to the brake rod. The piston 41 is spring pressed into normal inoperative position by the spring 43. A pipe 44 leads from this cylinder 40 to the main controlling valve, which will now be described.

The controlling valve comprises a valve casing 45 in which is slidably disposed a valve 46 having the transverse and oblique passages 47, 48, and 49. When this valve is in normal position, the passages all register with their respective exhaust ports 50, 51, and 52, at one side of the valve casing, while the other ends register with the grooves 53, 54, and 55, respectively, in the opposite side of the casing. Connected to the latter side of the casing 45, and to the grooves respectively, in the order named above, are the air pipes 56, 57, and 58, the first one leading to the cylinder 20, of the clutch pedal, the second to the cylinder 17 of the brake pedal, while the third is connected to the emergency brake cylinder 40. It will be noted that the upper passage 47 is approximately twice the width of the second passage 48, and that the second passage is twice the width of the third passage 49. On the upper end of the valve casing 45 there is pivotally mounted a lever 60, the intermediate portion of which is pivotally connected to the upper end of the valve 46. At the other side of the upper end of the casing 45 there is disposed a vertical standard 61 having a series of notches 62, 63, and 64, corresponding in the order named to the different positions to which the valve 46 is depressed, and the succession in which the passages register with their respective grooves in the side of the casing and uncover the intake ports 65, 66, and 67, formed in the side of the casing below the exhaust ports 50, 51, and 52, respectively. The passages of the valve, and the intake and exhaust ports are so proportioned and arranged that when the valve is pushed down to engage the lever 60 with the first notch 62, the intake ports will all be covered, and the exhaust ports uncovered. When the lever enters the notch 63 the valve will be so lowered as to permit air to pass from the reservoir or tank 16 through the passages 47 and 66 to the cylinders 17 and 20, operating the brake pedal 14 and throwing out the clutch. Movement of the valve so as to uncover the next port 67, permits air to pass from the reservoir to the cylinder 20 of the emergency brake. When the valve is pushed down to the last position the port 67 is uncovered and air passes from the reservoir to the emergency brake cylinder. It will be noted, however, that in all of the positions named, of the valve except the first one, the upper passage 47 registers with the intake passage 65, so that the clutch is maintained in released position during the application of the foot brake and the emergency brake successively and simultaneously. It will also be noted that when the foot brake is applied, that the passage 48 maintains its register with the port 66 while the passage 49 registers with the port 67. Thus when the valve 46 is moved from its uppermost inoperative position, to its lowermost full operative position, the clutch is released and maintained in such position, and the foot and emergency brakes applied successively. Leading from the reservoir and connected to the intake ports 65, 66, and 67, is an air pipe 68.

In the pipe 33 is mounted a gage 69 which registers the air pressure of the reservoir, thus enabling the driver to see, at all times, the condition of the air pressure of the reservoir.

In the ordinary application of the brakes the valve 46 is moved down to the second notch 63, which causes the release of the clutch and the operation of the foot brake pedal. Should it be desired to stop the automobile within a short space, the valve is moved to its lowermost position, when the clutch will be released and the foot and emergency brakes applied successively, the clutch being maintained in released position, and the foot brake maintained in applied position.

On one side of the air tank 16 is mounted a valved nipple 69', and connected to this nipple is a hose of sufficient length to reach the valves of the different tires of the automobile, and whereby the tires may be readily inflated.

While I have shown the pump 23 as driven by the fan shaft I wish it understood that the same may be placed at any other point on the automobile with equal effectiveness, as for instance at the fly wheel of the transmission shaft.

In the pipe line 33 is disposed an automatically operating valve 30' which when the pressure in the tank 16 reaches a predetermined level, will operate to discharge air into the cylinder 30 and cause the release of the clutch 32, and the cutting out of the pump.

In the head of each cylinder of the pump is mounted an intake check valve 27'.

What is claimed is:

1. An air brake system for an automobile including a clutching means, a foot braking means, and an emergency braking means, and a control valve for successively releasing the clutching means, and applying the foot braking means and the emergency braking means, while maintaining the clutching means in released position.

2. An air braking system for an automobile including a clutch, a foot brake, and an emergency brake, in combination with a supply of compressed air, and a valve for successively releasing the clutch and applying the foot and emergency brake said valve being arranged to hold the clutch in released position throughout the application of the foot and emergency brakes, and to hold the foot brake in applied position during the application of the emergency brake.

3. In an air braking system for an automobile, the combination with the clutch and brake pedals of the automobile, of air cylinders having pistons connected respectively with the clutch and brake pedals, a source of compressed air connected with the cylinders, and a valve between the air source and cylinders for delivering air to the said cylinders successively and maintaining the flow of air to the first cylinder while air is delivered to the second cylinder.

In testimony whereof, I affix my signature in the presence of two witnesses.

HERBERT GREEN.

Witnesses:
O. F. HEINEU,
S. F. MARTIN.